(12) United States Patent
Zhan et al.

(10) Patent No.: US 11,008,816 B2
(45) Date of Patent: May 18, 2021

(54) DRILL BITS FOR OIL AND GAS APPLICATIONS

(71) Applicant: Saudi Arabian Oil Company, Dhahran (SA)

(72) Inventors: Guodong Zhan, Dhahran (SA); Chinthaka Pasan Gooneratne, Dhahran (SA); Bodong Li, Dhahran (SA); Timothy E. Moellendick, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/524,883

(22) Filed: Jul. 29, 2019

(65) Prior Publication Data
US 2021/0032935 A1    Feb. 4, 2021

(51) Int. Cl.
| | |
|---|---|
| *E21B 12/02* | (2006.01) |
| *E21B 47/01* | (2012.01) |
| *E21B 10/08* | (2006.01) |
| *E21B 21/08* | (2006.01) |
| *E21B 47/18* | (2012.01) |

(52) U.S. Cl.
CPC .............. *E21B 12/02* (2013.01); *E21B 47/01* (2013.01); *E21B 10/08* (2013.01); *E21B 21/08* (2013.01); *E21B 47/18* (2013.01); *G01V 2210/1216* (2013.01)

(58) Field of Classification Search
CPC combination set(s) only.
See application file for complete search history.

(56) References Cited

U.S. PATENT DOCUMENTS

| | | | |
|---|---|---|---|
| 5,813,480 | A | 9/1998 | Zaleski, Jr. et al. |
| 6,268,726 | B1 | 7/2001 | Prammer |
| 6,612,384 | B1 | 9/2003 | Singh et al. |
| 6,993,432 | B2 | 1/2006 | Jenkins et al. |
| 9,222,350 | B2 | 12/2015 | Vaughn et al. |
| 9,464,487 | B1 | 10/2016 | Zurn |

(Continued)

FOREIGN PATENT DOCUMENTS

| | | |
|---|---|---|
| WO | WO 2010054353 | 5/2010 |
| WO | WO 2011139697 | 11/2011 |
| WO | WO 2015072971 | 5/2015 |

OTHER PUBLICATIONS

"IADC Dull Grading for PDC Drill Bits," Beste Bit, SPE/IADC 23939, 1992, 52 pages.

(Continued)

*Primary Examiner* — Cathleen R Hutchins
*Assistant Examiner* — Ronald R Runyan
(74) *Attorney, Agent, or Firm* — Fish & Richardson P.C.

(57) ABSTRACT

A drill bit includes multiple cutting devices and a microelectronics unit. Each cutting device of the multiple cutting devices includes a cutting layer formed to cut a rock formation and a capacitive sensor disposed adjacent the cutting layer. The capacitive sensor is configured to generate an electric field across the cutting layer and to transmit a signal corresponding to a voltage associated with the electric field. The microelectronics unit of the drill bit is configured to receive the signal from the capacitive sensor of each cutting device of the multiple cutting devices such that the microelectronics unit receives multiple signals and to determine an indicator of mechanical wear of the drill bit based on a change in the voltage associated with the electric field across the cutting layer of each cutting device of the multiple cutting devices using the multiple signals.

18 Claims, 5 Drawing Sheets

(56) References Cited

U.S. PATENT DOCUMENTS

| | | |
|---|---|---|
| 10,174,577 B2 | 1/2019 | Leuchtenberg et al. |
| 2012/0325564 A1 | 12/2012 | Vaughn et al. |
| 2013/0068525 A1 | 3/2013 | Digiovanni |
| 2013/0308424 A1 | 11/2013 | Kumar |
| 2014/0047776 A1 | 2/2014 | Scott et al. |
| 2014/0132468 A1 | 5/2014 | Scott et al. |
| 2014/0326506 A1 | 11/2014 | Difoggio |
| 2017/0292376 A1 | 10/2017 | Kumar et al. |
| 2018/0171772 A1 | 6/2018 | Rodney |
| 2019/0145183 A1 | 5/2019 | Potash |
| 2021/0032936 A1 | 2/2021 | Zhan et al. |

OTHER PUBLICATIONS

PCT Invitation to Pay Additional Fees and, where, Applicable, Protest Fee in International Application No. PCT/US2020/043,407, dated Oct. 27, 2020, 10 pages.

PCT International Search Report and Written Opinion in International Application No. PCT/US2020/043,853, dated Nov. 2, 2020, 15 pages.

PCT International Search Report and Written Opinion in International Application No. PCT/US2020/043407, dated Dec. 18, 2020, 17 pages.

wikipedia.org [online], "Chemical vapor deposition," available on or before Apr. 11, 2013, via Internet Archive: Wayback Machine URL <http://web.archive.org/web/20130411025512/http://en.wikipedia.org:80/wiki/Chemical_Vapor_Deposition>, retrieved on Feb. 9, 2021, URL <https://en.wikipedia.org/wiki/Chemical_vapor_deposition>, 12 pages.

wikipedia.org [online], "Atomic layer deposition," available on or before Sep. 10, 2014, via Internet Archive: Wayback Machine URL <http://web.archive.org/web/20140910101023/http://en.wikipedia.org/wiki/Atomic_layer_deposition>, retrieved on Feb. 9, 2021, <https://en.wikipedia.org/wiki/Atomic_layer_deposition>, 17 pages.

DRILL BITS FOR OIL AND GAS APPLICATIONS

TECHNICAL FIELD

This disclosure relates to drill bits that include sensors for monitoring mechanical wear of the drill bits during drilling operations in real time.

BACKGROUND

Drill strings deployed in hard rock formations can experience severe shock and vibration during drilling operations. Such shock and vibration can lead to premature equipment failure (for example, including damage to a drill bit carried by a drill string) and to a reduction in a rate of penetration (ROP) at which the drill bit can break rock underneath the drill bit and thus deepen a wellbore. A condition of a drill bit affects both invisible lost time (ILT) and non-productive time (NPT), which make up a significant portion of the overall cost of a drilling operation. For example, ROP decreases as wear of a drill bit progresses, and NPT is associated with stopping a drilling operation to replace or repair a drill bit (for example, as part of a bit trip). Various approaches may be utilized to address the impact of shock and vibration on a drill string during a drilling operation, such as changing a rotational speed of a drill bit or a downward force applied to the drill bit (for example, a weight-on-bit, WOB), employing shock subs, and deploying memory mode vibration logging tools along the drill string. However, these approaches are often associated with one or more significant drawbacks, such as a decreased drilling efficiency, an increased risk of encountering lateral vibrations that are strong enough to damage one or more components of the drill string, and operational temperatures that exceed a desired operating temperature.

SUMMARY

This disclosure relates to a drill bit that includes a microelectromechanical systems (MEMS) capacitive sensing system for analyzing mechanical wear of the drill bit during a drilling operation. The drill bit is equipped with multiple cutting devices (for example, polycrystalline diamond compact (PDC) cutters) and a microelectronics unit that is in electrical communication with the multiple cutting devices. Each cutting device includes a cutting layer, a substrate, and a capacitive sensor that is embedded within the cutting device. The capacitive sensor includes an insulation layer that is sandwiched between the cutting layer and the substrate, a positive electrode that is disposed at a first end of the insulation layer, and a negative electrode that is disposed at a second, opposite end of the insulation layer.

An electric field is generated between the positive and negative electrodes, and the insulation layer prevents current from flowing into the substrate layer of the cutting device. The electric field is affected by relative permittivities of sub-layers of the cutting layer of the cutting device and by mechanical wear of the cutting device. A change in the electric field at the capacitive sensor can be detected as a change in voltage, and the change in voltage can be correlated with an extent of mechanical wear at the cutting layer of the cutting device. The capacitive sensor at each of the cutting devices can transmit signals corresponding to the voltage across the cutting device in real time for real time monitoring of the overall mechanical wear of the drill bit.

In one aspect, a drill bit includes multiple cutting devices and a microelectronics unit. Each cutting device of the multiple cutting devices includes a cutting layer formed to cut a rock formation and a capacitive sensor disposed adjacent the cutting layer. The capacitive sensor is configured to generate an electric field across the cutting layer and to transmit a signal corresponding to a voltage associated with the electric field. The microelectronics unit of the drill bit is configured to receive the signal from the capacitive sensor of each cutting device of the multiple cutting devices such that the microelectronics unit receives multiple signals and to determine an indicator of mechanical wear of the drill bit based on a change in the voltage associated with the electric field across the cutting layer of each cutting device of the multiple cutting devices using the multiple signals.

Embodiments may provide one or more of the following features.

In some embodiments, the drill bit further includes a cutting body carrying the multiple cutting devices and a coupling member that is connected to the cutting body and to a drill string and that carries the microelectronics unit.

In some embodiments, the cutting layer of each cutting device includes one or more dielectric materials.

In some embodiments, the electric field has a first shape in a mechanically intact state of the cutting device, and the electric field has a second shape in a mechanically worn state of the cutting device, the second shape being different from the first shape.

In some embodiments, the cutting device includes a first amount of the one or more dielectric materials in the mechanically intact state, and the cutting device includes a second amount of the one or more dielectric materials in the mechanically worn state, the second amount being less than the first amount.

In some embodiments, the cutting layer of each cutting device includes diamond.

In some embodiments, each cutting device of the multiple cutting devices further includes a substrate layer, and the capacitive sensor is embedded between the cutting layer and the substrate layer of the cutting device.

In some embodiments, the capacitive sensor includes an insulation layer, includes a positive electrode and a negative electrode connected to the insulation layer, spaced apart from each other, and together generating the electric field across the cutting layer, and includes one or more electrical connections configured to transmit the signal corresponding to the voltage associated with the electric field across the cutting layer.

In some embodiments, the one or more electrical connections are configured to transmit the signal to the microelectronics unit in real time.

In some embodiments, the indicator of mechanical wear includes a depth of cut (DOC) of the drill bit within the rock formation.

In some embodiments, the indicator of mechanical wear includes a rate of penetration (ROP) of the drill bit within the rock formation.

In some embodiments, the microelectronics unit is further configured to control operations of the drill bit to maintain the DOC at a constant value.

In another aspect, a method of monitoring mechanical wear of a drill bit during a drilling operation includes deploying the drill bit to a rock formation. The drill bit includes multiple cutting devices and a microelectronics unit. The method further includes generating multiple electric fields respectively across multiple cutting layers of the multiple cutting devices, transmitting multiple signals respectively corresponding to multiple voltages associated with the multiple electric fields to the microelectronics unit, and determining an indicator of mechanical wear of the drill bit based on changes in the multiple voltages at the microelectronics unit using the multiple signals.

Embodiments may provide one or more of the following features.

In some embodiments, the method further includes changing a shape of an electric field of a cutting device of the multiple cutting devices from a first shape in a mechanically intact state to a second shape in which the cutting device is in a mechanically worn state.

In some embodiments, the method further includes reducing an amount of one or more dielectric materials of the cutting device from a first amount in the mechanically intact state to a second amount in the mechanically worn state.

In some embodiments, the cutting device of the multiple cutting devices includes a capacitive sensor and one or more electrical connections. The capacitive sensor includes an insulation layer and a positive electrode and a negative electrode connected to the insulation layer, spaced apart from each other, and together generating an electric field across the cutting layer. The one or more electrical connections are configured to transmit a signal corresponding to a voltage associated with the electric field across the cutting layer.

In some embodiments, the method further includes transmitting the multiple signals to the microelectronics unit in real time.

In some embodiments, the indicator of mechanical wear includes a depth of cut (DOC) of the drill bit within the rock formation.

In some embodiments, the indicator of mechanical wear includes a rate of penetration (ROP) of the drill bit within the rock formation.

In some embodiments, the method further includes controlling operations of the drill bit to maintain the DOC at a constant value.

The details of one or more embodiments are set forth in the accompanying drawings and description. Other features, aspects, and advantages of the embodiments will become apparent from the description, drawings, and claims.

DETAILED DESCRIPTION

Figure 1:
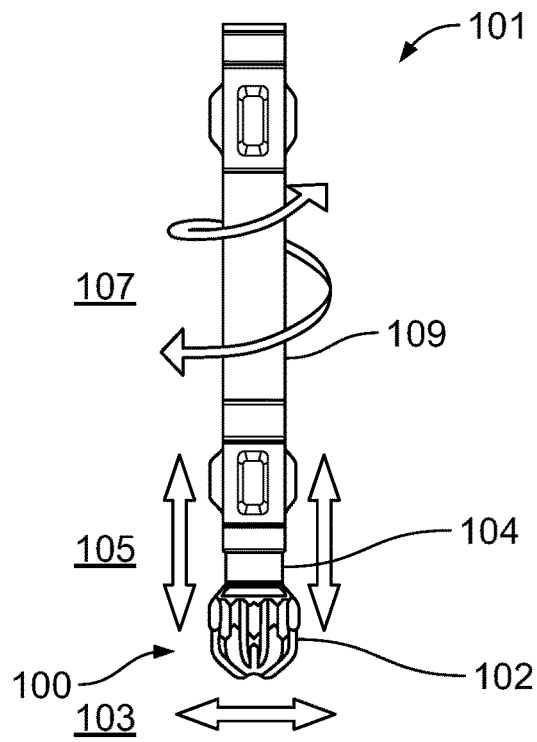
FIG. 1 is a side view of an example drill string designed to drill a rock formation.
Figure 2:
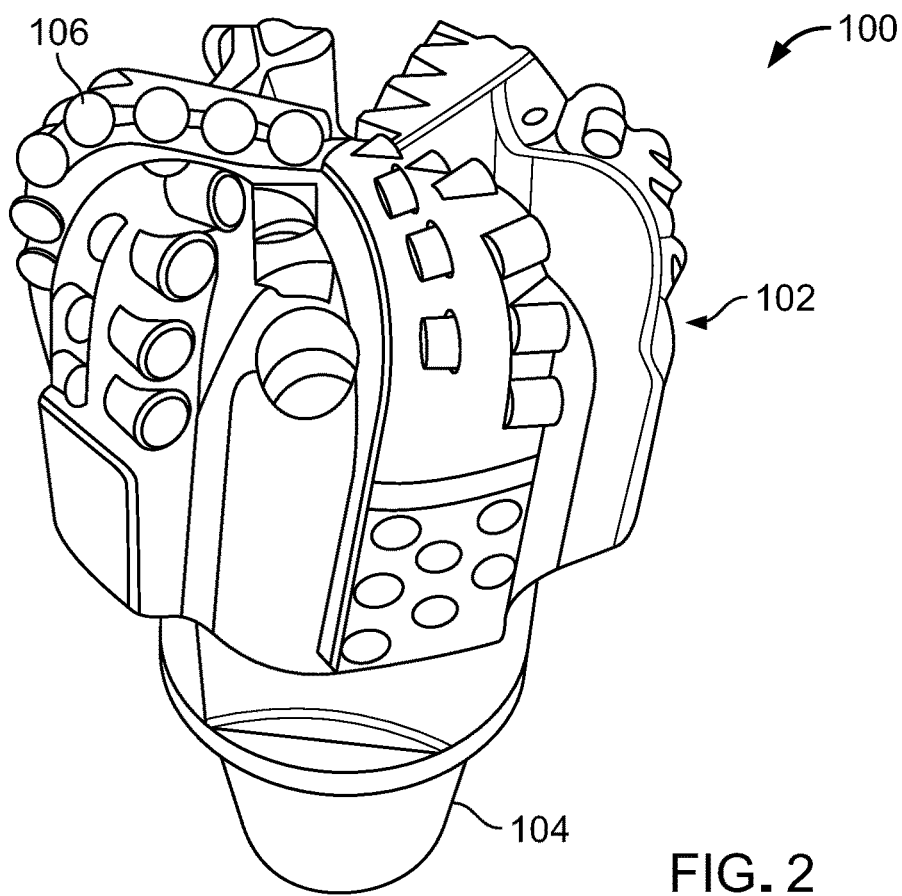
FIG. 2 is a perspective view of an example drill bit of the drill string of FIG. 1.
Figure 3:
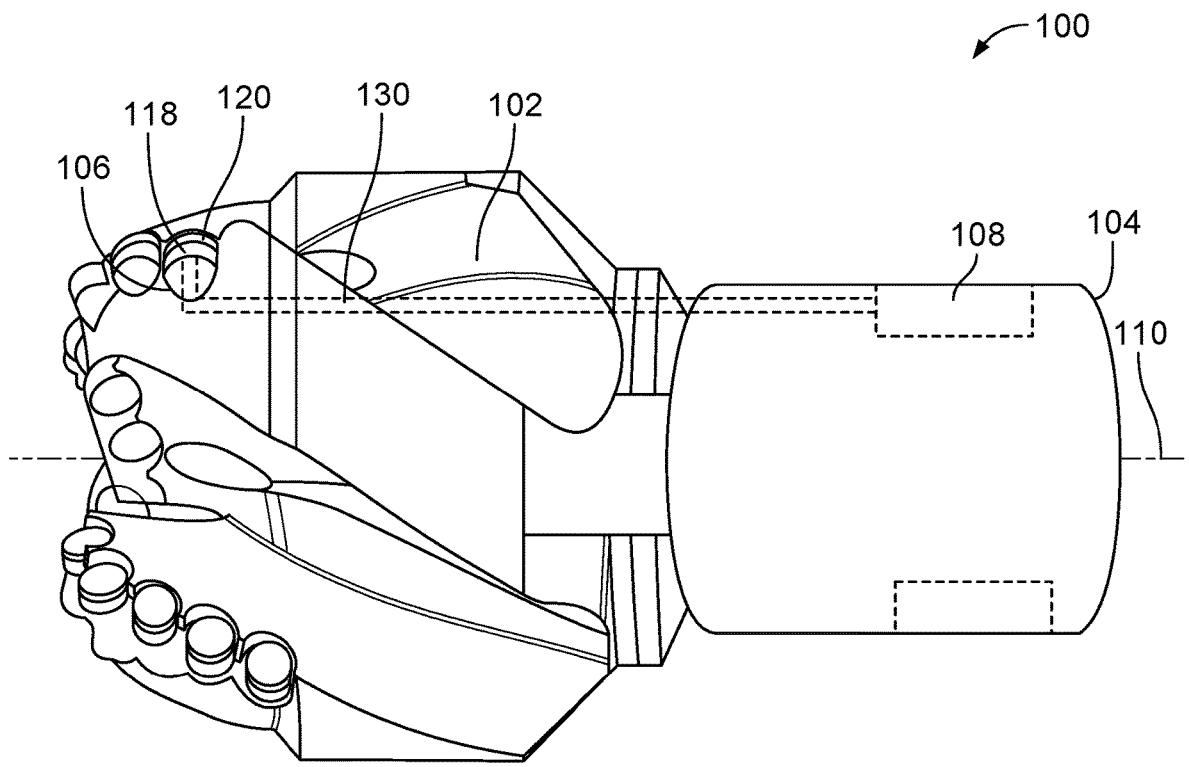
FIG. 3 is another perspective view of the drill bit of FIG. 2.
Figure 4:
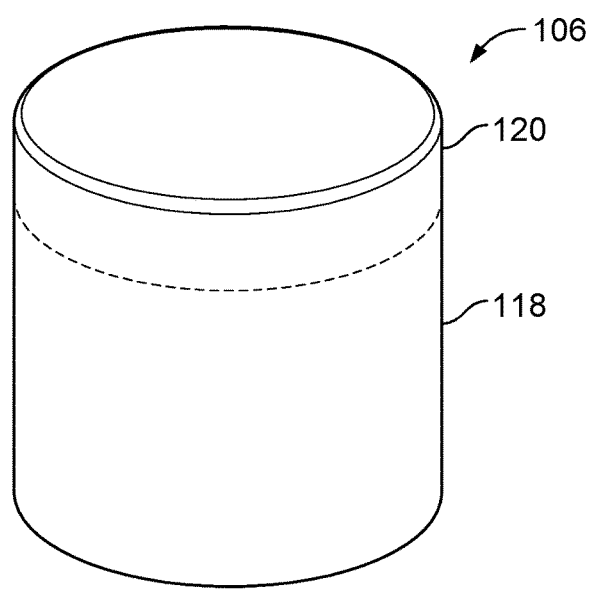
FIG. 4 is a perspective view of a cutter of the drill bit of FIG. 2.

FIGS. 1-3 illustrate a drill bit 100 designed to drill (for example, one or more of cut, crush, and scrape) a rock formation to produce or further form a wellbore. The drill bit 100 is installed to a bottom end of a drill string 101 and may experience various types of vibration during operation, including lateral vibration 103, vertical vibration 105, and torsional vibration 107. Such vibrations can result in mechanical wear of the drill bit 100 as the drill bit 100 forcefully impacts the rock formation.

The drill bit 100 includes a cutting body 102 and a coupling member 104 (for example, a bit sub) that connects the cutting body 102 to a shaft 109 of the drill string 101. The cutting body 102 is equipped with multiple cutters 106 (for example, PDC cutters), and the coupling member 104 is equipped with a microelectronics unit 108 that is in electrical communication with the cutters 106 and that includes a microprocessor and microcontroller. The cutting body 102 typically has a length of about 0.267 meters (m) to about 0.5 m and a maximum diameter of about 0.095 m to about 0.445 m. In some embodiments, the cutting body 102 is made of tungsten carbide. The coupling member 104 typically has a length of about 0.1 m to about 0.5 m and a diameter of about 0.05 m to about 0.5 m. In some embodiments, the coupling member 104 is made of steel.

Figure 5:
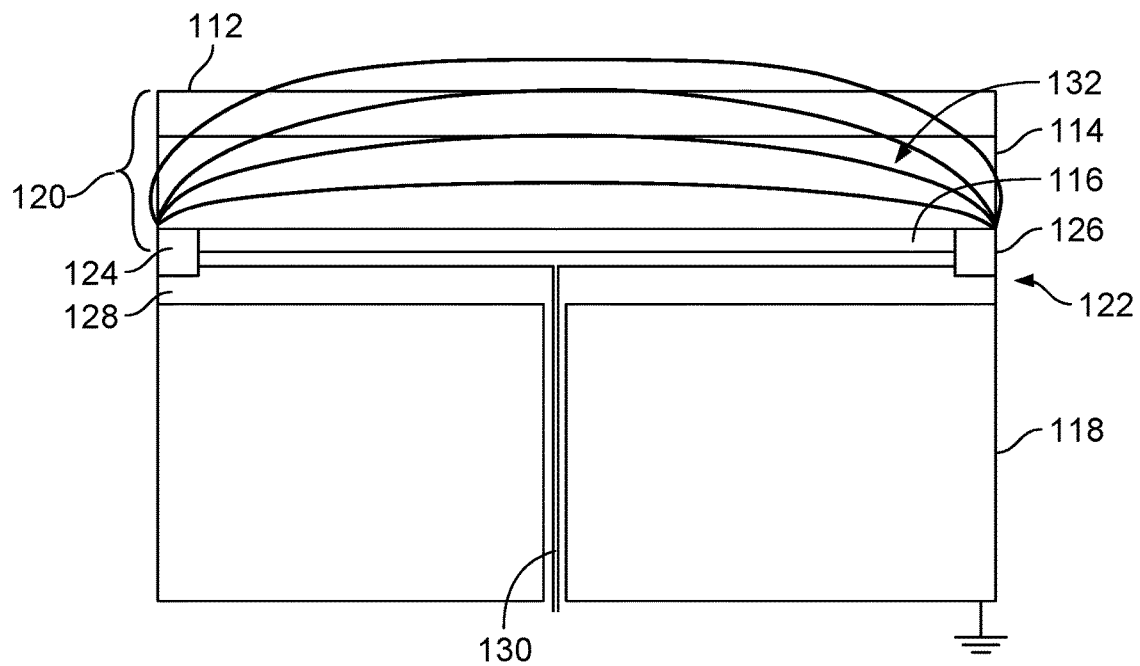
FIG. 5 is a cross-sectional view of the cutter of FIG. 4 in a mechanically intact state with an initial electric field across a capacitive sensor of the cutter.
Figure 6:
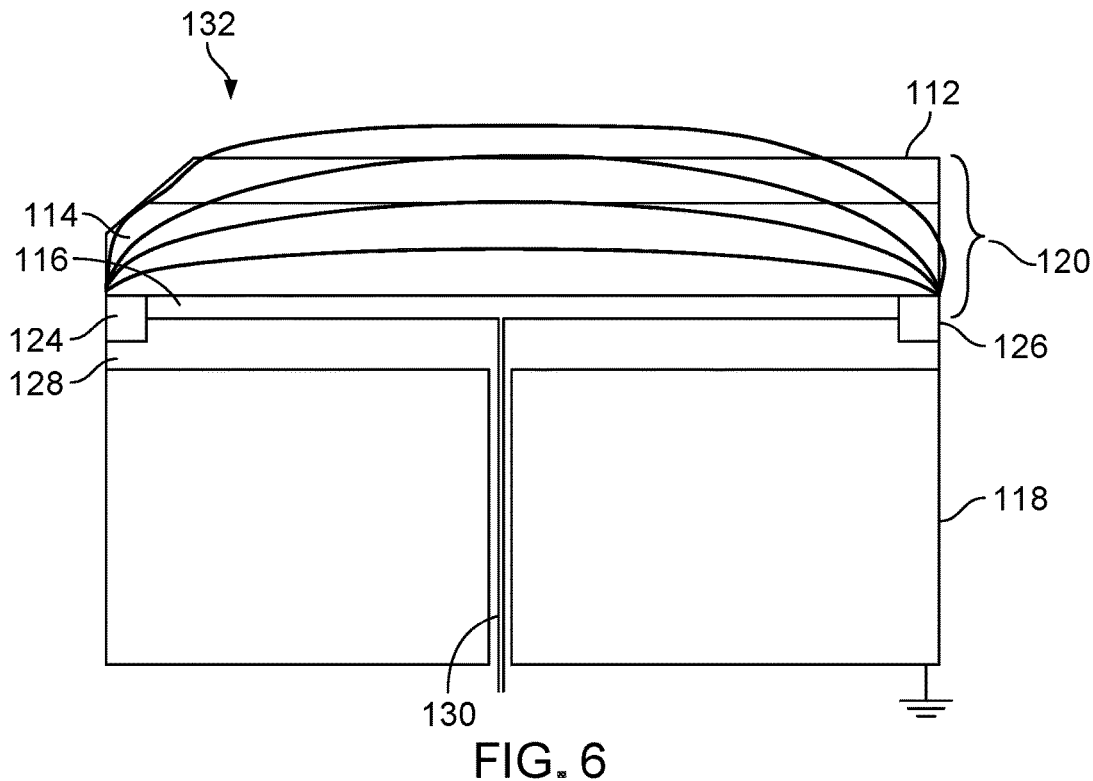
FIG. 6 is a cross-sectional view of the cutter of FIG. 4 in a mechanically worn state with a perturbed electric field across the capacitive sensor of the cutter.

The cutters 106 are designed to drill the rock formation while the drill bit 100 is rotated (for example, spun) about a central axis 110. The cutting body 102 typically carries a total of 20 cutters 106 to 120 cutters 106. Referring to FIGS. 3-6, each cutter 106 has a generally cylindrical shape and includes multiple (for example, four) layers made of dielectric materials, including a leached layer 112 made of diamond, an unleached layer 114 made of diamond and cobalt, a non-planar interface (NPI) 116 made of diamond, cobalt, and tungsten carbide, and a substrate 118 made of tungsten carbide and cobalt. The layers 112, 114, 116 together form a cutting layer 120 that drills the rock formation and may be referred to as a diamond table. The substrate 118 is attached to the cutting layer 120 and is attached to the cutting body 102 (for example, via brazing). During a drilling operation, the cutting layer 120 may experience mechanical wear along any of the layers 112, 114, 116 such that the cutter 106 transitions from a mechanically in-tact state (for example, without substantial material loss, as shown in FIG. 5) to a mechanically worn state (for example, shown in FIG. 6). Such mechanical wear may be characterized generally as a loss of material of one or more of the layers 112, 114, 116.

The leached layer 112 typically has an initial depth (for example, thickness) of about 0.01 centimeters (cm) to about 0.2 cm (for example, about 0.05 cm), the unleached layer 114 typically has an initial depth of about 0.1 cm to about 0.5 cm (for example, about 0.2 cm), the NPI interface 116 typically has an initial depth of about 0.01 cm to about 0.05 cm (for example, about 0.02 cm), and the substrate 118 typically has an initial depth of about 0.1 cm to about 0.5 cm (for example, about 0.11 cm). A diameter (for example, a width) of the layers 112, 114, 116, 118 determines the diameter of the cutter 106. The layers 112, 114, 116, 118 typically have an initial diameter of about 0.5 cm to about 5 cm (for example, about 0.8 cm, about 1.1 cm, about 1.3 cm, about 1.6 cm, about 1.9 cm, about 2.2 cm, or about 4.9 cm).

Each layer 112, 114, 116, 118 of the cutter 106 has a different relative permittivity, which can be examined to determine a wear integrity (for example, an extent of mechanical wear) of the cutter 106. Accordingly, the cutter 106 is equipped with a capacitive sensor 122 (for example, a microelectromechanical systems device, or MEMS device) that can detect changes in the wear integrity based on any changes in the relative permittivities of the layers 112, 114, 116, 118. The capacitive sensor 122 is embedded between the NPI interface 116 and the substrate 118. The capacitive sensor 122 includes a positive electrode 124 located along one side of the cutter 106, a negative electrode 126 (for example, a ground electrode) located along an opposite side of the cutter 106, an insulation layer 128 to which the electrodes 124, 126 are connected, and electrical connections 130 (for example, vertical interconnect access connections, or VIA connections) that extend from the electrodes 124, 126 to the microelectronics unit 108 through the substrate 118 and the cutting body 102 of the drill bit 100.

The positive electrode 124 is driven by an alternating current (AC) waveform (for example, a sinusoidal wave), which creates an electric field 132 between the positive and negative electrodes 124, 126. The insulation layer 128 coats a top surface of the substrate 118 and is joined to a remaining portion of the cutter 106 (for example, via brazing). The insulation layer 128 prevents any current generated between the positive and negative electrodes 124, 126 from flowing through the substrate 118. Absorption of moisture into the insulation layer is undesirable and can disturb measurements. Therefore, the insulation layer 128 is typically made of one or more hydrophobic materials that can be coated on the materials that form the substrate 118 (for example, tungsten and cobalt), such as polyimide, polytetrafluoroethylene (PTFE), and parylene. The insulation layer 128 typically has a thickness of about 0.01 cm to about 0.05 cm (for example, about 0.01 cm).

The relative permittivity of a dielectric material is a ratio of the dielectric permittivity of the material to the dielectric permittivity of free space. The relative permittivity measures how the electric field behaves or interacts with the dielectric material and how easily the dielectric material is polarized by the electric field. Thus, the electric field 132 depends on the relative permittivities of the layers 112, 114, 116, 118. The relative permittivity of the cutter 106 may be characterized as a bulk permittivity that reflects all of the relative permittivities of the layers 112, 114, 116, 118. When the cutter 106 is mechanically worn, the electric field 132 is perturbed (for example, illustrated as a change in shape in the electric field 132 shown in FIG. 6 as compared to the shape of the electric field 132 shown in FIG. 5). The change in the electric field 132 is detected as a change in a voltage across the positive and negative electrodes 124, 126 of the capacitive sensor 122. The voltage is related to the electric field 132 according to Equations 1-4, where:

V is the voltage detected across the electrodes 124, 126 of the capacitive sensor 122, I is the current flowing between the electrodes 124, 126 of the capacitive sensor 122

Z is the impedance of the capacitive sensor 122, where Z depends on the electric field 132, R is the resistance of the capacitive sensor 122, $X_C$ is the capacitive reactance (when V and I are at a maximum) of the capacitive sensor 122, f is the frequency of the voltage applied to the capacitive sensor 122, C is the capacitance of the capacitive sensor 122, A is the cross-sectional area of the cutter 106, d is the diameter of the cutter 106, $\epsilon_r$ is the relative permittivity of the cutter 106, $\epsilon_0$ is the dielectric permittivity of the cutter 106, $$V = IZ \qquad \text{(Equation 1)}$$

$$Z = \sqrt{(R^2 + X_C^2)} \qquad \text{(Equation 2)}$$

$$X_C = 1/(2\pi f C) \qquad \text{(Equation 3), and}$$

$$C = (\epsilon_r \epsilon_0 A)/d \qquad \text{(Equation 4)}$$

The electrical connections 130 can deliver one or more signals corresponding to the detected voltage to the microelectronics unit 108 in real time for real-time monitoring of the mechanical wear of the cutter 104. Either or both of the microcontroller and the microprocessor of the microelectronics unit 108 can carry out any of multiple actions, including performing data acquisition, performing signal processing, recording data in memory, and transmitting data to a measurement-while-drilling (MWD) unit upstream of the drill string 101. The microprocessor of the microelectronics unit 108 can correlate a change in the voltage detected across the capacitive sensor 122 to a percentage of mechanical wear of the cutter 104. In some examples, the percentage of mechanical wear of the cutter 104 is calculated as the inverse of a ratio of a current depth of the leached layer 112 to an initial depth of the leached layer 112, or as the inverse of a ratio of a current depth of the cutting layer 120 to an initial depth of the cutting layer 120.

As shown in FIGS. 2 and 3, the cutting body 102 of the drill bit 100 carries multiple cutters 106. Each cutter 106 is equipped with a capacitive sensor 122 that delivers one or more signals corresponding to a detected voltage to the microelectronics unit 108 via electrical connections 130. Once the average percentage of mechanical wear of all of the cutters 106 reaches a threshold value, then various corrective actions may occur to mitigate any undesirable impact of operating the drill bit 100 in an excessively, mechanically worn state.

In some examples, a rate at which the drill bit 100 can deepen a wellbore (for example, the ROP in units of length per hour) depends on one or more parameters, including design features of the drill bit 100, a rotational speed of the drill bit 100 (for example, in units of rotations per minute, RPM), and a hardness of the rock formation. Referring to a graph 140 shown in FIG. 7, when the WOB applied to the drill bit 100 increases (for example, or, in an analogous analysis, when the rotational speed of the drill bit 100 increases), the ROP of the drill bit 100 should also increase. If the drill bit 100 is performing efficiently, then the ROP will increase proportionately to the increase in the WOB. However, if the drill bit 100 is performing inefficiently, then the ROP will increase disproportionately to the increase in the WOB or the ROP will decrease, even as the WOB increases. Typically, inefficient performance of the drill bit 100 results primarily from mechanical wear, which is related to a reduced depth of cut (DOC) of the drill bit 100. Thus, the DOC can be estimated in real time based on an average voltage (for example, plus or minus 5V) sensed at all of the capacitors 122 of the multiple cutters 106. Furthermore, the ROP can be calculated as (for example, ideally calculated as) the DOC multiplied by the WOB. That is, the DOC is equal to a slope 134 of a curve 136 produced from plotting ROP versus WOB.

Figure 7:
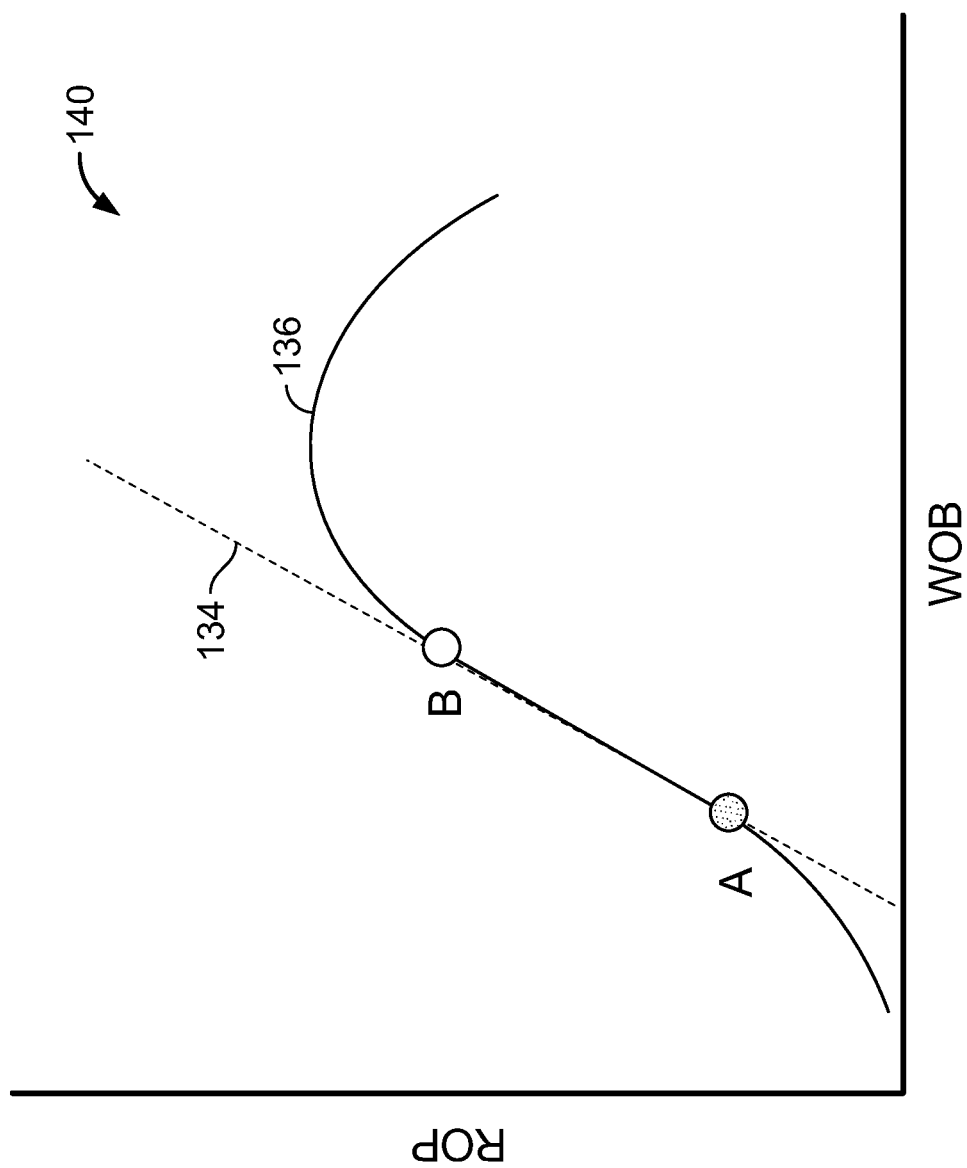
FIG. 7 is a graph of an ROP versus a WOB of the drill bit of FIG. 2.

Still referring to FIG. 7, the drill bit 100 tends to be inefficient during an initial loading phase (for example, as the WOB initially increases). However, an efficiency of the drill bit 100 increases as the WOB increases, such that the DOC (for example, the slope 134 of the curve 136) reaches a peak value at point A on the curve 136. The efficiency (for example, and therefore the ROP) of the drill bit 100 continues to increase proportionately to an increase in the WOB, such that the DOC remains constant at the peak value until the efficiency of the drill bit 100 begins to decrease at an inflection value at point B on the curve 136, where the DOC begins to decrease. The point at which the DOC begins to decrease is referred to as bit flounder and marks the point at which bit balling may occur. In some examples, bit balling may include fouling of a rotary drilling bit in a viscous, sticky shale, which can cause significant drag on the drilling bit and loss of circulation. This point may also correspond to a threshold value of the average percentage of mechanical wear of the drill bit 100. In some examples, the threshold value may be between about 10 percent (%) and about 50%

Based on the voltages detected across the capacitive sensors 122 in real time, the microcontroller of the microelectronics unit 108 may control the drill string 101 to operate at a point close to, but not at or beyond, the point of bit flounder (for example, point B on the curve 136) in order to maximize the performance efficiency of the drill bit 100. Controlled actions can occur automatically to effect smart drilling operations at the wellbore that result in optimal performance of the drill bit 100 and other components of the drill string 101 to minimize effects of shock and vibration on the drill bit 100, as well as to decrease overall drilling time and therefore to decrease a total cost of a drilling operation. Furthermore, the capacitive sensors 122 are capable of operating at temperatures that are less than about 175 degrees Celsius (° C.). Such operational capability is important because an electronic system lithium battery will melt at a temperature of greater than or equal to about 175° C. Other actions may be taken by drilling personnel to optimize the performance of the drill bit 100 based on the voltages detected across the capacitive sensors 122 in real time, including determining the point of bit flounder at various rotational speeds and conducting step tests by varying a flow rate of drilling fluid or drilling mud.

Figure 8:
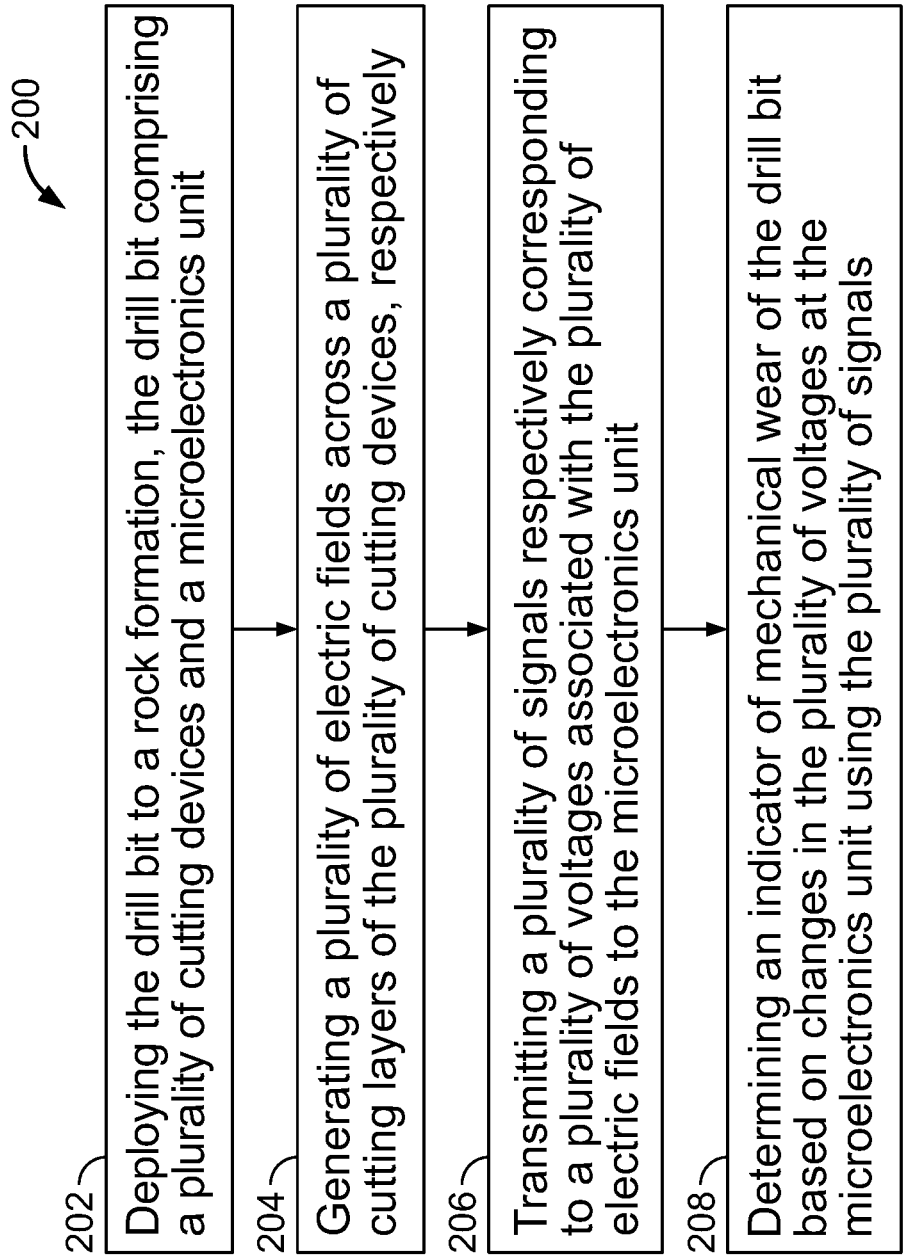
FIG. 8 is a flow chart illustrating an example method of monitoring mechanical wear of the drill bit of FIG. 2 during a drilling operation.

FIG. 8 is a flow chart illustrating an example method 200 of monitoring mechanical wear of a drill bit (for example, the drill bit 100) during a drilling operation. In some embodiments, the method 200 includes deploying the drill bit to a rock formation, the drill bit including multiple cutting devices (for example, the cutters 106) and a microelectronics unit (for example, the microelectronics unit 108) (202). In some embodiments, the method 200 further includes generating electric fields (for example, the electric fields 132) across cutting layers (for example, the cutting layers 120) of multiple cutting devices (204). In some embodiments, the method further includes transmitting signals respectively corresponding to voltages associated with the electric fields to the microelectronics unit (206). In some embodiments, the method further includes determining an indicator of mechanical wear of the drill bit based on changes in the voltages at the microelectronics unit using the signals (208).

While the drill bit 100 has been described and illustrated with respect to certain dimensions, sizes, shapes, arrangements, materials, and methods 200, in some embodiments, a drill bit 100 that is otherwise substantially similar in construction and function to the drill bit 100 may include one or more different dimensions, sizes, shapes, arrangements, and materials or may be utilized according to different methods. For example, while the cutters 106 have been described and illustrated as including four layers made of certain materials, in some embodiments, a drill bit cutter that is otherwise substantially similar in construction and function to the drill bit 100 may include cutters with a different number of layers or layers made of different materials.

Other embodiments are also within the scope of the following claims.

What is claimed is:

1. A drill bit comprising:
   a plurality of cutting devices, wherein each cutting device of the plurality of cutting devices comprises:
      a cutting layer formed to cut a rock formation, and
      a capacitive sensor disposed adjacent the cutting layer and configured to:
         generate an electric field across the cutting layer, and
         transmit a signal corresponding to a voltage associated with the electric field; and
   a microelectronics unit configured to:
      receive the signal from the capacitive sensor of each cutting device of the plurality of cutting devices such that the microelectronics unit receives a plurality of signals,
      determine a real-time percentage of mechanical wear of the drill bit during drilling based on a change in the voltage associated with the electric field across the cutting layer of each cutting device of the plurality of cutting devices using the plurality of signals,
      determine a threshold percentage of mechanical wear of the drill bit that corresponds to an inflection point of a performance efficiency of the drill bit, and
      automatically control one or more operational parameters of the drill bit during drilling to maintain the real-time percentage of mechanical wear of the drill bit below the threshold percentage of mechanical wear of the drill bit.

2. The drill bit of claim 1, further comprising:
   a cutting body carrying the plurality of cutting devices; and
   a coupling member connected to the cutting body and to a drill string and carrying the microelectronics unit.

3. The drill bit of claim 1, wherein the cutting layer of each cutting device comprises one or more dielectric materials.

4. The drill bit of claim 3, wherein the cutting device comprises a first amount of the one or more dielectric materials in a mechanically intact state, and wherein the cutting device comprises a second amount of the one or more dielectric materials in a mechanically worn state, the second amount being less than the first amount.

5. The drill bit of claim 3, wherein the cutting layer of each cutting device comprises diamond.

6. The drill bit of claim 1, wherein each cutting device of the plurality of cutting devices further comprises a substrate layer, and wherein the capacitive sensor is embedded between the cutting layer and the substrate layer of the cutting device.

7. The drill bit of claim 1, wherein the capacitive sensor comprises:
   an insulation layer,
   a positive electrode and a negative electrode connected to the insulation layer, spaced apart from each other, and together generating the electric field across the cutting layer, and
   one or more electrical connections configured to transmit the signal corresponding to the voltage associated with the electric field across the cutting layer.

8. The drill bit of claim 7, wherein the one or more electrical connections are configured to transmit the signal to the microelectronics unit in real time.

9. The drill bit of claim 1, wherein the one or more operational parameters comprise a rate of penetration (ROP) of the drill bit within the rock formation, and wherein the microelectronics unit is further configured to control indicator of mechanical wear comprises a rate of penetration (ROP) the ROP of the drill bit within the rock formation to maintain the real-time percentage of mechanical wear of the drill bit below the threshold percentage of mechanical wear of the drill bit.

10. The drill bit of claim 9, wherein the one or more operational parameters comprise a weight exerted on the drill bit, and wherein the microelectronics unit is further configured to control the weight exerted on the drill bit to maintain the real-time percentage of mechanical wear of the drill bit below the threshold percentage of mechanical wear of the drill bit.

11. The drill bit of claim 1, wherein the microelectronics unit is further configured to control the one or more operational parameters of the drill bit to maintain a depth of cut (DOC) of the drill bit within the rock formation at a constant value to maintain the real-time percentage of mechanical wear of the drill bit below the threshold percentage of mechanical wear of the drill bit.

12. The drill bit of claim 11, wherein the microelectronics unit is further configured to determine the DOC from the one or more operational parameters.

13. The drill bit of claim 1, wherein the threshold percentage of mechanical wear of the drill bit is within a range of 10% to 50%.

14. The drill bit of claim 1, wherein the threshold percentage of mechanical wear of the drill bit further corresponds to an operational point at which a DOC of the drill bit within the rock formation begins to decrease from a substantially constant value.

15. A method of monitoring mechanical wear of a drill bit during a drilling operation, the method comprising:
 deploying the drill bit to a rock formation, the drill bit comprising a plurality of cutting devices and a microelectronics unit;
 generating an electric field across a cutting layer of each cutting device;
 generating a signal corresponding to a a voltage associated with the electric field of each cutting device such that a plurality of signals are generated;
 transmitting the plurality of signals to the microelectronics unit; and
 determining, at the microelectronics unit, a real-time percentage of mechanical wear of the drill bit during drilling based on a change in the voltage associated with the electric field across the cutting layer of each cutting device of the plurality of cutting devices using the plurality of signals;
 determining, at the microelectronics unit, a threshold percentage of mechanical wear of the drill bit that corresponds to an inflection point of a performance efficiency of the drill bit; and
 automatically controlling, at the microelectronics unit, one or more operational parameters of the drill bit during drilling to maintain the real-time percentage of mechanical wear of the drill bit below the threshold percentage of mechanical wear of the drill bit.

16. The method of claim 15, further comprising reducing an amount of one or more dielectric materials of the cutting device from a first amount in a mechanically intact state to a second amount in a mechanically worn state.

17. The method of claim 16, wherein each cutting device of the plurality of cutting devices comprises a capacitive sensor, the capacitive sensor comprising:
 an insulation layer,
 a positive electrode and a negative electrode connected to the insulation layer, spaced apart from each other, and together generating an electric field across the cutting layer, and
 one or more electrical connections configured to transmit a signal corresponding to a voltage associated with the electric field across the cutting layer.

18. The method of claim 17, further comprising transmitting the plurality of signals to the microelectronics unit in real time.

* * * * *